(12) United States Patent
Edamitsu et al.

(10) Patent No.: US 6,533,473 B1
(45) Date of Patent: Mar. 18, 2003

(54) IMAGING APPARATUS WITH EXPOSURE CONTROLLING MECHANISM

(75) Inventors: Toshiaki Edamitsu, Chiba; Yusuke Nanjo, Kanagawa; Keisuke Ikegami; Yuichi Nakano, both of Chiba, all of (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 09/692,168

(22) Filed: Oct. 20, 2000

(30) Foreign Application Priority Data

Oct. 21, 1999 (JP) ............................................. 11-299215

(51) Int. Cl.[7] .............................................. G03B 9/08
(52) U.S. Cl. ...................... 396/450; 396/508; 348/221; 348/362
(58) Field of Search ................................ 396/449, 450, 396/451, 505, 507, 508; 348/221, 335, 342, 362, 363–366

(56) References Cited

U.S. PATENT DOCUMENTS 4,827,348 A * 5/1989 Ernest et al. ............... 348/221
5,293,542 A * 3/1994 Ise et al. .................... 348/335

* cited by examiner

*Primary Examiner*—David M. Gray
(74) *Attorney, Agent, or Firm*—Ronald P. Kananen, Esq.; Rader, Fishman & Grauer, PLLC

(57) ABSTRACT

An imaging apparatus with an exposure controlling mechanism being made to define an iris aperture by moving iris blades on surfaces perpendicular to an optical axis, wherein the exposure controlling mechanism includes a first iris blade to which a first ND filter having at least two levels of transmissivity is attached, a second iris blade to which no ND filter is attached, and a third iris blade to which a second ND filter having a single transmissivity is attached, and the first to the third iris blades are made to differ respectively in amounts and phases of their displacements caused by an operation of a driving means.

4 Claims, 6 Drawing Sheets

IMAGING APPARATUS WITH EXPOSURE CONTROLLING MECHANISM

BACKGROUND OF THE INVENTION

1. Field of the Invention

The present invention relates to an imaging apparatus with an exposure controlling mechanism, in particular relating to an imaging apparatus realizing the driving of a plurality of iris blades so as to differ in amounts and phases of their displacements from each other by means of a single driving motor.

2. Description of the Related Art

In an exposure controlling mechanism of an imaging apparatus such as a video camera, there has come to be used an imaging apparatus changed to be small in size, light in weight and cheap in cost by using two iris blades moving in opposite directions to each other on a line in place of the so-called iris diaphragm which adjusts the diameter of an aperture of a diaphragm by rotating a plurality of iris blades around an optical axis.

However, if the diameter of the aperture becomes too small much when an object is bright, the degradation of the picture quality owing to diffraction, the coming out of dust owing to the increase of the depth of focus, and so forth become problems.

Accordingly, there comes an imaging apparatus which prevents an extreme small diaphragm aperture state by affixing an ND (neutral density) filter on one of the iris blades and protruding the ND filter into a cutoff of the iris blade for forming the iris aperture.

FIG. 5 shows an exposure controlling mechanism "a" having the structure mentioned above. The exposure controlling mechanism "a" comprises two iris blades "b" and "c" and a driving means "d" for driving these iris blades "b" and "c".

In one iris blade "b", a cutoff "e" for forming an iris aperture is formed at the lower edge thereof. Moreover, at positions near to the right side edge and the left side edge of the iris blade "b", two guided slits "f" extending in the vertical direction and a guided slit "g" extending also in the vertical direction are formed, respectively. Furthermore, an elongated link aperture "h" extending in the horizontal direction is formed at a position right above the guided slit "f" on the upper right side.

Then, guide pins provided to a housing, not shown, having a light penetration aperture are slidably engaged with the guided slits "f" and "g", respectively. Thereby, the iris blade "b" is supported by the housing slidably in the vertical direction.

In the other iris blade "c", a cutoff "i" for forming an iris aperture is formed at the upper edge thereof. An ND filter "j" is attached to the blade "c" so as to cover the lower end portion of the cut off "i" for forming the iris aperture. Moreover, at positions near to the left side edge and the right side edge of the iris blade "c", two guided slits "k" extending in the vertical direction and a guided slit "l" extending also in the vertical direction are formed, respectively. Incidentally, an ND filter having a transmission factor of, for example, 10 percent is used as the ND filer "j". Furthermore, an elongated link aperture "m" extending in the horizontal direction is formed at a position right above the guided slit "k" on the upper left side.

Then, similarly to the iris blade "b", guide pins provided to the housing, not shown, are slidably engaged with the guide slits "k" and "l", respectively. Thereby, the iris blade "c" is supported by the housing slidably in the vertical direction.

The driving means "d" comprises a driving motor "n" attached at an upper part of the riot shown housing and an operation arm "o" fixed to a rotation axis of the driving motor "n". The operation arm "o" is formed to be elongated horizontally, and a center portion of the operation arm "o" is fixed to the rotation axis of the driving motor "n". A connecting pin "p" is projectingly fixed at each end on the right side and the left side of the operation arm "o". Then, the connecting pin "p" on the right side is slidably engaged with the elongated link aperture "h" of the iris blade "b", and the connecting pin "p" on the left side is slidably engaged with the elongated link aperture "m" of the iris blade "c".

Consequently, because the connecting pins "p" move in opposite directions from each other, respectively, when the operation arm "o" is rotated in conformity with the operation of the driving motor "n", the iris blades "b" and "c" that are linked to those connecting pins "p" respectively move to the upper direction and the lower direction oppositely. This changes the iris aperture (diaphragm aperture diameter) regulated by the respective cutoffs "e" and "i" for forming the iris aperture of the iris blades "b" and "c".

FIGS. 6A–6G show the shapes of the iris aperture "q" and the states of the covering of the iris aperture "q" by the ND filter "j", namely the states of the ND filter being inserted in the iris aperture "q" when the iris aperture "q" is gradually narrowed from an opened iris aperture state shown in FIG. 6A to a small iris aperture state shown in FIG. 6G by moving the iris blades "b" and "c" in the exposure controlling mechanism "a".

Incidentally, the exposure controlling mechanism "a" has a problem that the not-covered portion "r" formed at the time when the ND filter "j" does not cover the whole of the iris aperture "q", as shown in FIG. 6E, at an intermediate process to the small iris aperture state, as shown in FIG. 6G, shows effects just like those in the small iris aperture state, such as degradation of the picture quality owing to diffraction and dust coming out owing to the increase of the depth of focus. Furthermore, there is another problem that light reflected from an image sensor or a surface of a seal glass hits the surface of the ND filter "j" on the image sensor side to come out in the screen by being reflected again at the surface of the ND filter "j".

SUMMARY OF THE INVENTION

In view of the aforesaid problems, the present invention aims to prevent the degradation of the picture quality in the intermediate state in the process from the opened iris aperture state to the small iris aperture state and to decrease the reflected light coming out of the image sensor and the like.

For resolving the aforesaid problems, according to a first aspect of the invention, there is provided an imaging apparatus with an exposure controlling mechanism comprising a first iris blade to which a first ND filter having at least two levels of transmissivity is attached, a second iris blade to which no ND filter is attached; and a third iris blade to which a second ND filter having a single transmissivity is attached, in which the first to the third iris blades are made to differ respectively in amounts and phases of their displacements caused by the operation of a driving means.

Consequently, it becomes possible to control appropriately the shapes of the iris aperture and the insertion amounts of the ND filters into the iris aperture in accordance with various states of the iris aperture. And then, the degradation of picture quality at a specified diaphragm state, such as a small diaphragm aperture state, can be prevented.

Furthermore, according to a second aspect of the invention, the imaging apparatus of the first aspect is further characterized in that: the driving means for the first to the third iris blades includes a driving motor attached to the housing of the exposure controlling mechanism and an operation arm fixed to a rotation axis of the driving motor, the operation arm including three arm portions at a tip portion of each of which one connecting pin is projectingly fixed, respectively, the connecting pin being slidably engaged with an elongated link aperture of each of the first to the third iris blades, and the first to the third iris blades are made to differ respectively in amounts and phases of their displacements caused by a rotation of the driving motor owing to differences in the lengths of the three arm portions and the projection directions from the center of the driving motor of the operation arms.

Consequently, it becomes possible to control appropriately the shapes of the iris aperture and the insertion amounts of the ND filters into the iris aperture in accordance with various states of the iris aperture to the most suitable states.

Furthermore according to a third aspect of the invention, the imaging apparatus of the first aspect is further characterized in that: the first iris blade, the second iris blade and the third iris blade are arranged in order from the object side.

Consequently it becomes possible to prevent the iris aperture from becoming a small iris aperture state or becoming just like the small iris aperture state when the ND filter does not yet cover the whole of the iris aperture.

Furthermore according to a fourth aspect of the invention, the imaging apparatus of the first aspect is further characterized in that the first iris blade covers the iris aperture at a later time than the third iris blade.

Consequently, it becomes possible to decrease the reflected light coming out of the image sensor and the like.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

The attached drawings are referred while describing an embodiment of the imaging apparatus according to the present invention.

The imaging apparatus according to the present invention includes an exposure controlling mechanism 1 restricting an iris aperture by moving iris blades on a surface perpendicular to an optical axis. Incidentally, in the following description, it is supposed that "vertical direction" and "horizontal direction" mean the vertical direction and the horizontal direction, respectively, when the exposure controlling mechanism 1 is viewed from the object side, and also it is supposed that "front direction" means the object side and "rear direction" means the image side, respectively.

Figure 1:
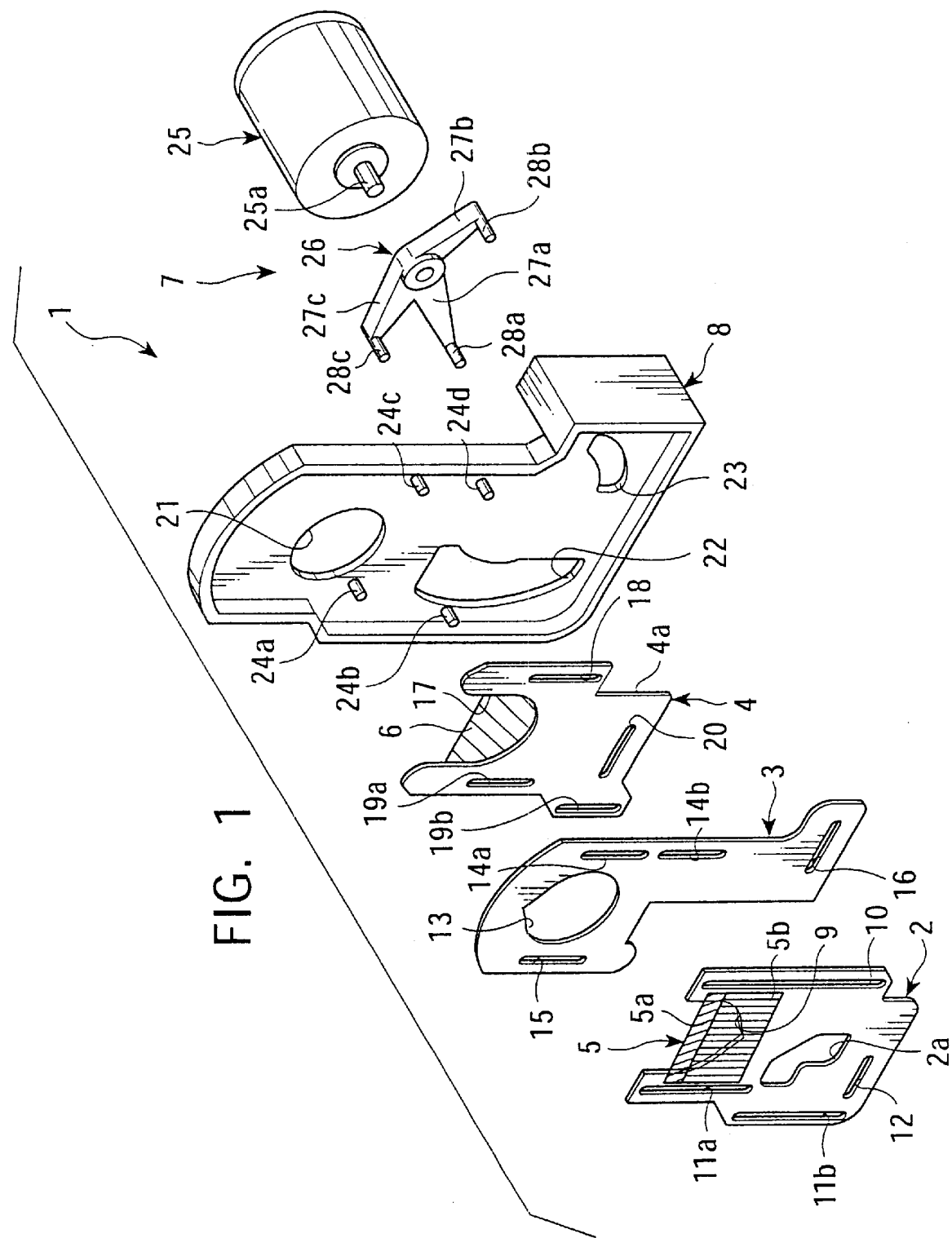
FIG. 1 is an analytic perspective view showing an exposure controlling mechanism of an imaging apparatus according to an embodiment of the present invention.

That is, the exposure controlling mechanism 1 comprises, as shown in FIG. 1, three, i.e. from a first to a third, iris blades 2–4, a first ND filter 5 attached to the first iris blade 2, a second ND filter 6 attached to the third iris blade 4, a driving means 7 for driving the first to the third iris blades 2–4, a housing 8 to which the driving means 7 is fixed, and the like.

The iris blades 2–4 are made from, for example, a resin film that is not so easily folded. The second iris blade 3 is arranged between the first iris blade 2 and the third iris blade 4. The first iris blade 2 is arranged on the object side in an imaging lens system, not shown, of the imaging apparatus according to the present invention, and the third iris blade 4 is arranged on the image side in the imaging lens system.

A window 2a having a shape winding at an almost middle position thereof is formed at the lower center position of the first iris blade 2. Moreover, a cutoff 9 for forming the iris aperture is formed at the upper edge of the first iris blade 2. Furthermore, at positions near to the right side edge and the left side edge of the iris blade 2, a guided slit 10 extending in the vertical direction and two guided slits 11a and 11b extending also in the vertical direction are formed, respectively. In addition, an elongated link aperture 12 extending in the horizontal direction is formed at a position near to the lower edge of the iris blade 2 and on the right side of the lower left guided slit 11b.

The second iris blade 3 has a shape such that almost half of the lower left side portion of the iris blade 3 is cut out. That is, the iris blade 3 has a shape such that the half portion of the right side lower edge portion is elongated downward. A cutoff 13, or an opening, for forming the iris aperture is formed at an upper position of the iris blade 3. Moreover, at positions near to the right side edge and the left side edge of the iris blade 3, two guided slits 14a and 14b extending in the vertical direction and a guided slit 15 extending also in the vertical direction are formed, respectively. In addition, an elongated link aperture 16 extending in the horizontal direction is formed at a position near to the lower edge of the right side half portion elongated downward of the iris blade 3, namely a position right under the lower right side guided slit 14b.

A cutoff 17 for forming the iris aperture is formed at the upper edge of the third iris blade 4. And, at positions near to the right side edge and the left side edge of the third iris blade 4, a guided slit 18 extending in the vertical direction and two guided slits 19a and 19b extending also in the vertical direction are formed, respectively. In addition, an elongated link aperture 20 extending in the horizontal direction is formed at a position near to the lower edge of the third iris blade 4 and on the right side of the lower left guide slit 19b. Incidentally, a cutoff 4a is formed at a lower portion on the right side edge of the third iris blade 4.

The first ND filter 5 is formed to be different in density between an upper portion 5a thereof, and a lower portion 5b thereof so that the upper portion 5a and the lower portion 5b have transmissivity different from each other. The transmissivity of the upper portion 5a is about 33 percent, and the transmissivity of the lower portion 5b is about 10 percent. The second ND filter 6 entirely has the same transmissivity (about 33 percent).

The housing 8 has almost an L-like shape when it is viewed from the object side. The housing 8 has a light-transmitting aperture 21 formed at an upward position, a window 22 formed at a lower left side position, and a window 23 formed at a lower right side position. Furthermore, four guide pins 24a–24d to be engaged with the guided slits 10, 11a, 11b, 14a, 14b, 15, 18, 19a and 19b separately, as it will be described later, are formed at about a center portion of the housing 8 in a manner such that each two of the four guide pins 24a–24d are fixed at the left side and the right side of the center portion to project toward the front side (object side).

The driving means 7 comprises a driving motor 25 fixed to the housing 8 from the rear side by an appropriate way and an operation arm 26 fixed to the rotation axis 25a of the driving motor 25.

The operation arm 26 has three arm portions 27a–27c projecting different directions respectively when they are viewed from the front side, namely the directions of about seven o'clock, four o'clock and nine o'clock on a face of a clock, and having a length different from each other. Connecting pins 28a–28c projecting to the front side are formed integrally with respective arm portions 27a–27c at their tip portions. The connecting pins 28a and 28c project to the front side through the window 22 of the housing 8, and the connecting pin 28b projects to the front side through the window 23.

Figure 2:
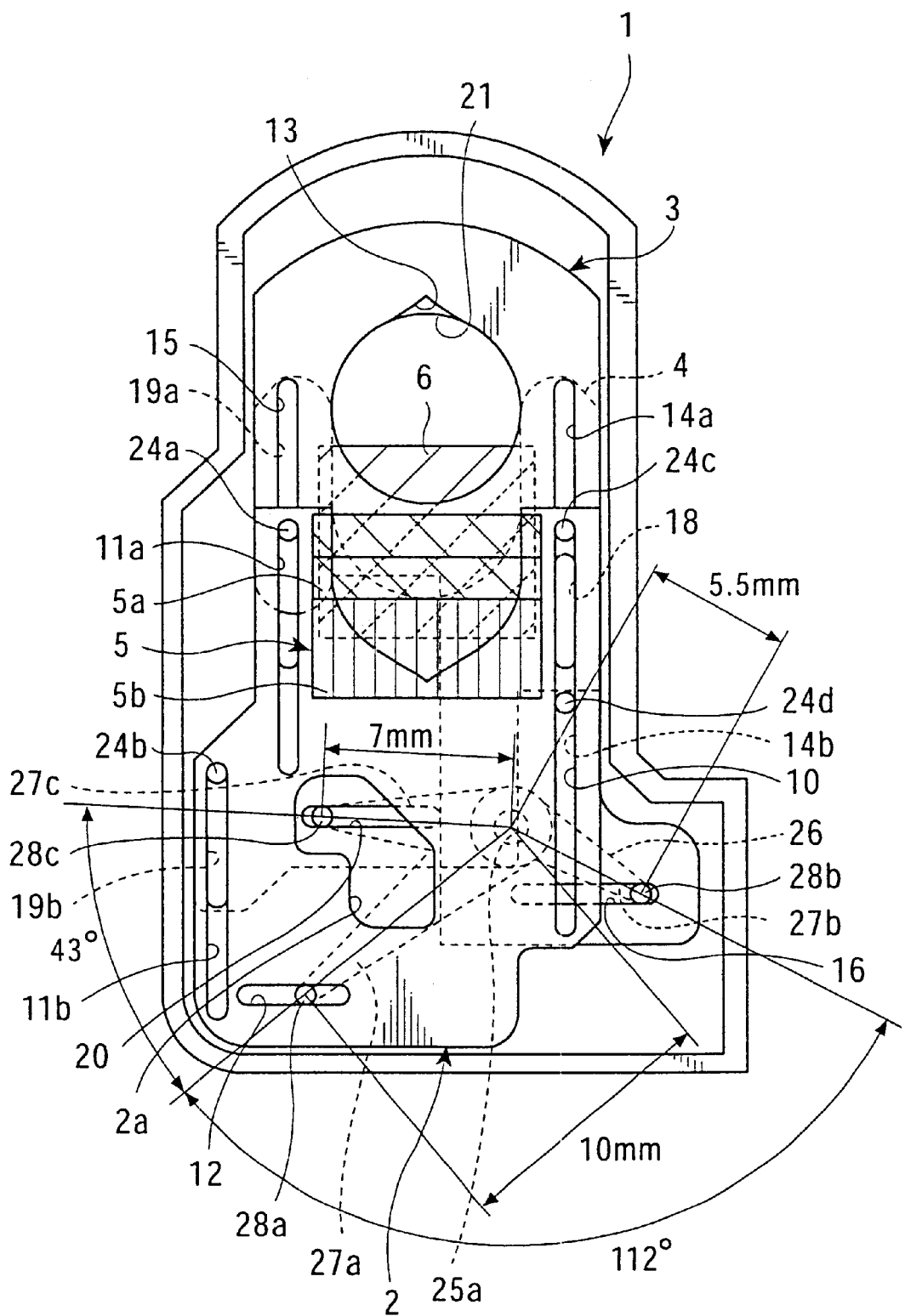
FIG. 2 is a front view showing the exposure controlling mechanism shown in FIG. 1.
Figure 3A:
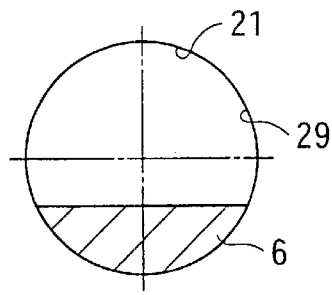
FIGS. 3A–3G are schematic drawings showing the state of the iris aperture of the exposure controlling mechanism shown in FIG. 1 at each step of shifting from an opened iris aperture state to a small iris aperture sate.
Figure 3B:
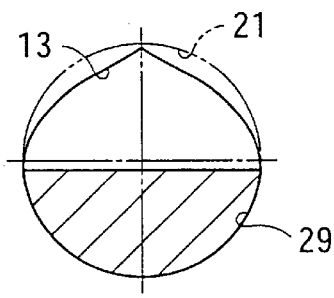
Figure 3C:
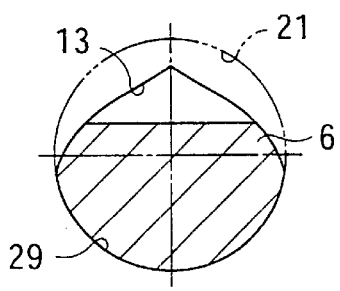
Figure 3D:
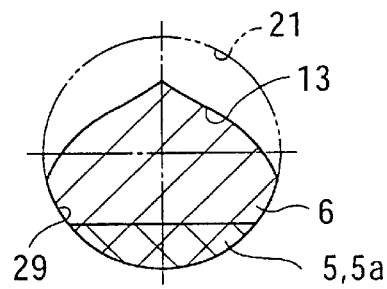
Figure 3E:
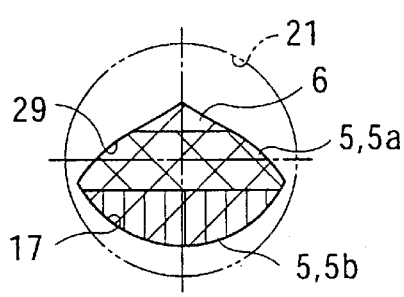
Figure 3F:
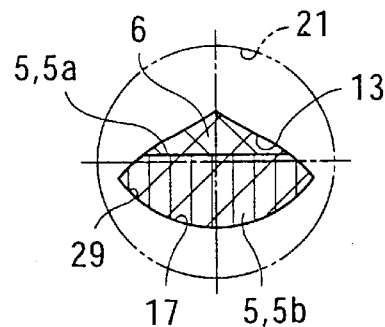
Figure 3G:
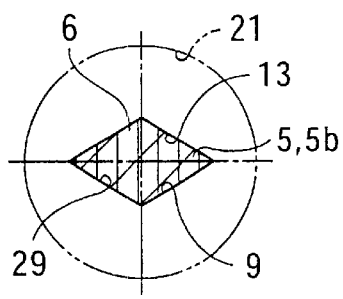

Incidentally, among the lengths of the three arm portions 27a, 27b and 27c from the center of rotation where the three arm portions 27a–27c are attached to the rotation axis 25a of the driving motor 25, as shown in FIG. 2, the arm portion 27a is the longest (about 10 mm), and the arm portion 27c (about 7 mm) and the arm portion 27b (about 5.5 mm) follow in the order. Moreover, in regard to the relationships of the relative angles among the arm portions 27a–27c, the arm portions 27a and 27b form about 43°, and the arm portions 27b and 27c form about 112°.

Consequently, in the exposure controlling mechanism 1, as shown in FIGS. 1 and 2, the guide pins 24a–24d of the housing 8 are separately engaged with each of the guided slits 10, 11a, 11b, 14a, 14b, 15, 18 19a and 19b of the third iris blade 4, the second iris blade 3 and the first iris blade 2, respectively, in the order, and further the connecting pins 28a, 28b and 28c of the operation arm 26 are separately engaged with each of the elongated link apertures 12, 16 and 20 of the third iris blade 4, the second iris blade 3 and the first iris blade 2, respectively.

That is, the guide pin 24a is slidably engaged with the guided slits 19a, 15 and 11a of the third to the first iris blades 4, 3 and 2 in the order, the guide pin 24b is slidably engaged with the guided slits 19b and 11b of the third and the first iris blades 4 and 2, and the guide pin 24c is slidably engaged with the guided slits 18, 14a and 10 of the third to the first iris blades 4, 3 and 2, and the guide pin 24d is slidably engaged with the guide slits 14b and 10 of the second and the first iris blades 3 and 2.

Furthermore, the connecting pin 28a is slidably engaged with the elongated link aperture 12 of the first iris blade 2, the connecting pin 28b is slidably engaged with the elongated link aperture 16 of the second iris blade 3 and the connecting pin 28c is slidably engaged with the elongated link aperture 20 of the third iris blade 4.

Incidentally, for preventing interference of iris blades, which are not in a relationship of engagement, among the first to the third iris blades 2–4 with each of the connecting pins 28a–28c when the first to the third iris blades 2–4 are attached to the housing 8, each of the iris blades 2–4 are formed in the aforesaid specific figures. That is, the window 2a is formed in the first iris blade 2 for preventing the interference with the connecting pin 28c, the second iris blade 3 is formed in a shape such that almost half of the lower left side portion thereof is cut out, namely a shape such that the half portion of the right side lower edge portion thereof is elongated downward, for preventing the interference with the connecting pins 28a and 28c and the cutoff 4a is formed in the third iris blade 4 for preventing the interference with the connecting pin 28b.

Then, when the driving motor 25 is operated to rotate the operation arm 26, the first to the third iris blades 2–4 are respectively moved, or displaced, in the vertical direction. Then, as mentioned before, because the arm portions 27a–27c of the operation arm 26 differ in amounts (lengths) and directions of their projection from their rotation center (the rotation axis 25a of the driving motor 25) respectively, the first to the third iris blades 2–4 respectively differ in amounts and phases of their displacements caused by the operation of the driving motor 25. Consequently, as shown in FIGS. 3A–3G, the shapes of the iris aperture 29 defined by respective cutoffs 9, 13 and 17 for forming the iris aperture 29 and the regions of the iris aperture 29 covered by the first and second ND filters 5 and 6, namely the regions where the first and second ND filters 5 and 6 are inserted, vary.

Incidentally, in this case, while the first and second ND filters 5 and 6 do not completely cover the whole iris aperture 29 yet, the uncovered portion of the iris aperture 29 does not take he condition similar to the small diaphragm aperture state. Consequently, various problems owing to diffraction and the like do not occur, unlike in the conventional techniques. That is, in the exposure controlling mechanism 1, by defining the amounts (lengths) and directions of projections of the arm portions 27a, 27b and 27c of the operation arm 26 from the center of rotation (the rotation axis 25a of the driving motor 25), the shapes of the iris aperture 29 and the amounts of insertion of the first and second ND filters 5 and 6 are controlled to be the most suitable states according to various situations of the diaphragm, and thereby the various problems can be resolved.

Figure 4:
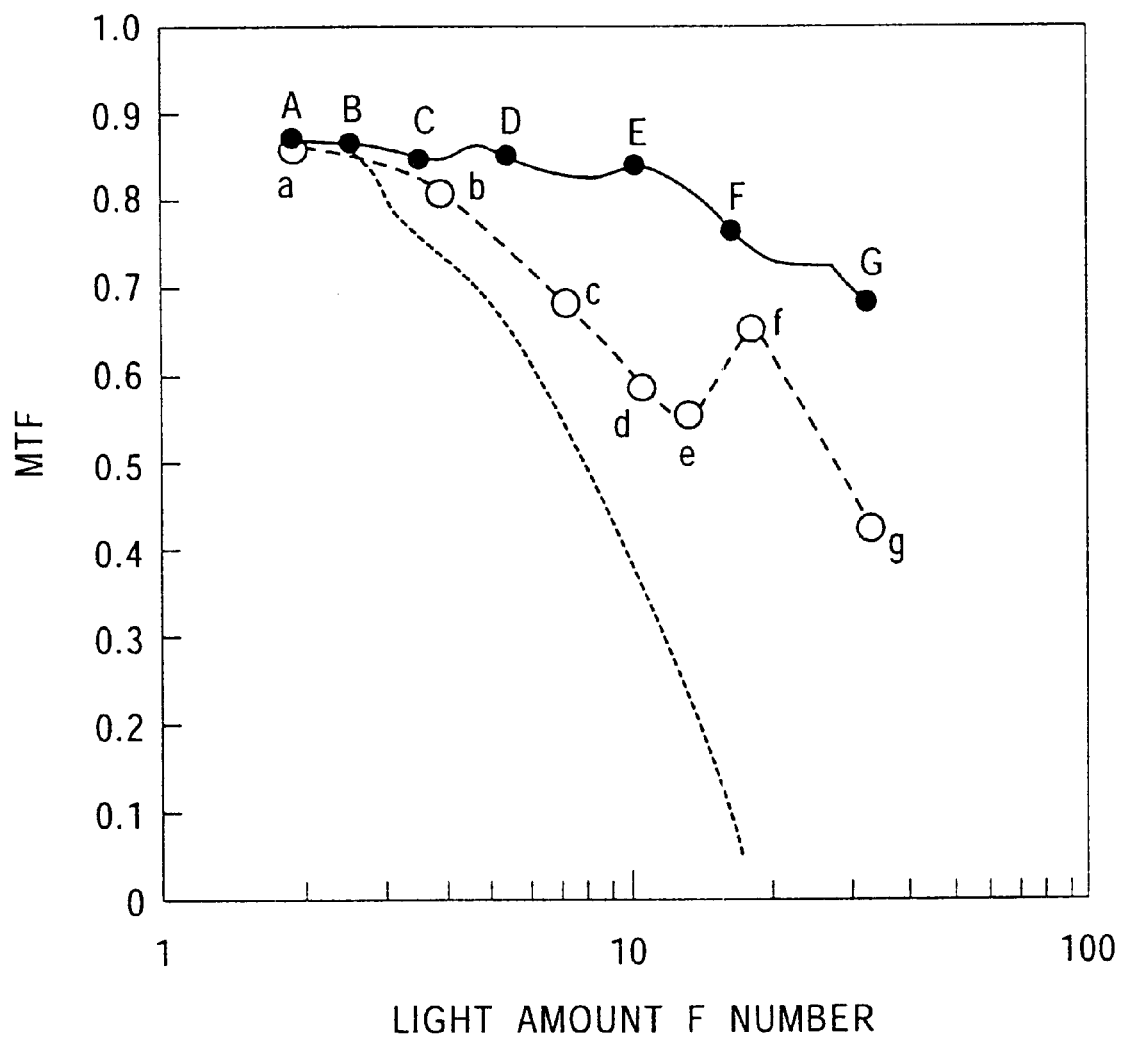
FIG. 4 is a graph showing MTF (modulation transfer function) values of the exposure controlling mechanism shown in FIG. 1 and conventional exposure controlling mechanisms.
Figure 5:
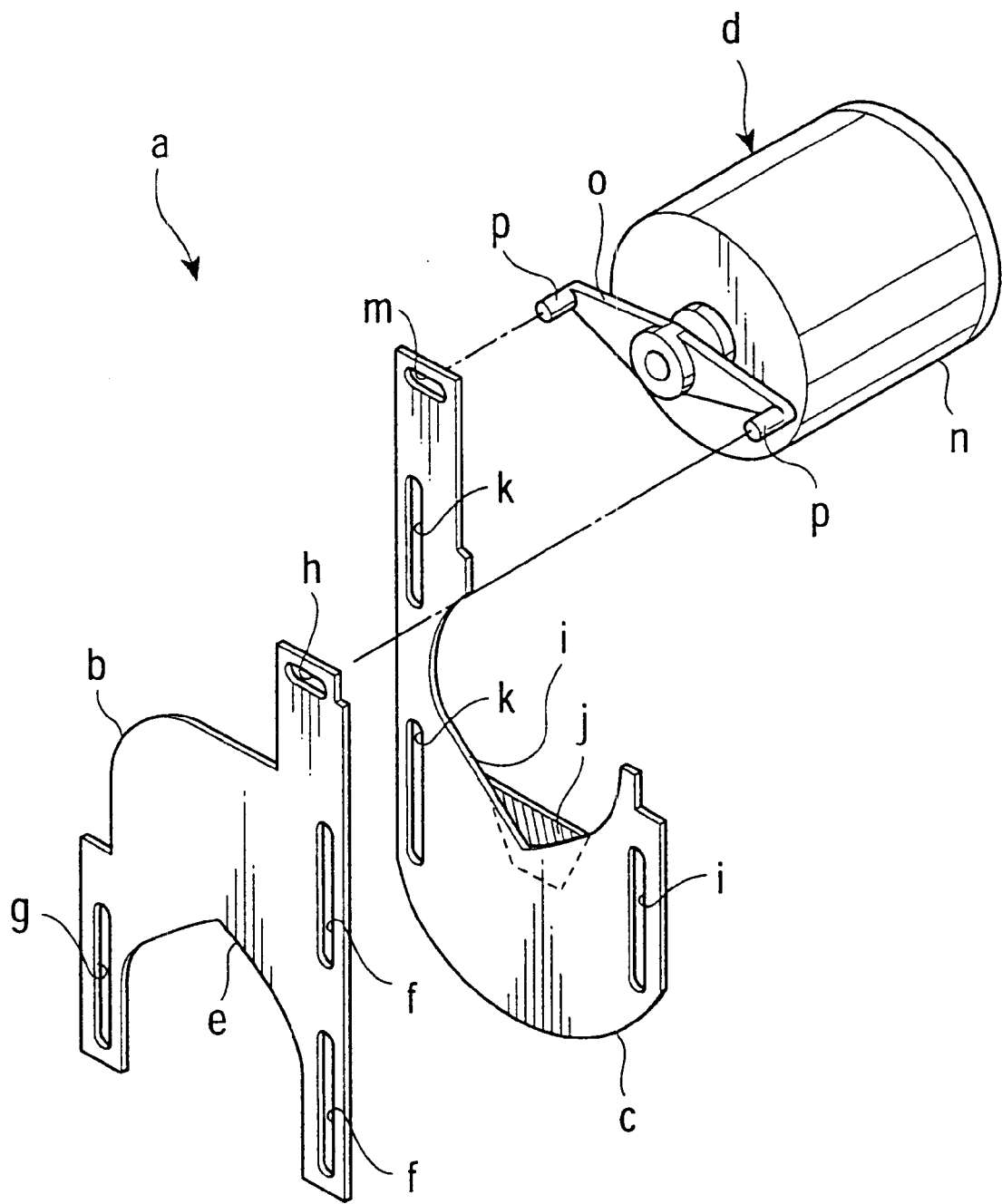
FIG. 5 is an analytical perspective view showing an exposure controlling mechanism of a conventional imaging apparatus.
Figure 6A:
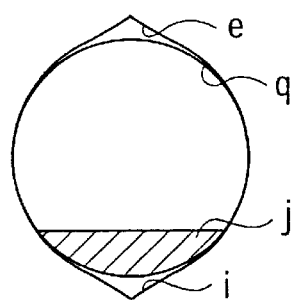
FIGS. 6A–6G are schematic drawings showing the state of the iris aperture of the exposure controlling mechanism shown in FIG. 5 at each step of shifting from an opened iris aperture state to a small iris aperture state.
Figure 6B:
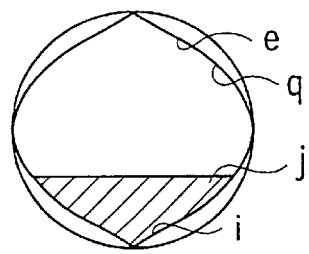
Figure 6C:
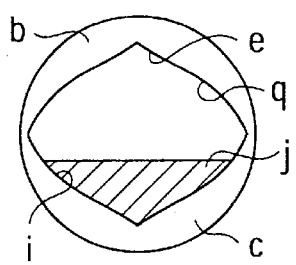
Figure 6D:
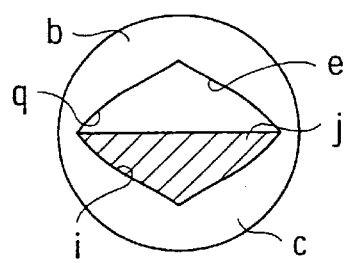
Figure 6E:
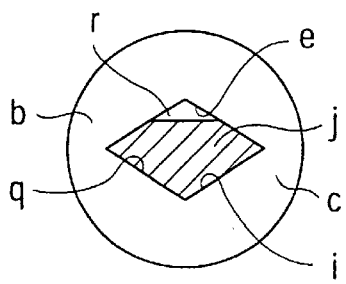
Figure 6F:
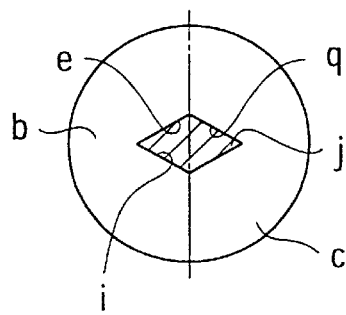
Figure 6G:
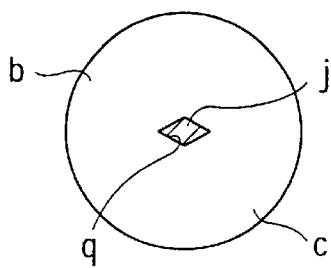

FIG. 4 shows modulation transfer function (MTF) values vs. light amount F numbers in a solid line concerning the exposure controlling mechanism 1 having a spatial frequency of 96 lines/mm corresponding to 260 lines in resolution of a television picture tube having a diagonal size of 2.25 mm. Incidentally, the transmissivity of the two parts of the first ND filter 5 are 33% and 10%, and the whole of the ND filter 6 is 33%. Furthermore, FIG. 4 also shows MTF values of a conventional exposure controlling mechanism having an ND filter in 10 percent transmissivity in a state that the ND filter is always hanging in an lens of the aperture of F/5.6 in a broken line having a relatively long gaps and MTF values in a case of an exposure controlling mechanism having no ND filter and an iris aperture in circle in a broken line having a relatively short gaps. In FIG. 4 characters "A" to "G" and "a" to "g" correspond to the shapes of the iris apertures shown in FIGS. 3A–3G and FIGS. 6A–6G, respectively.

As apparent from FIG. 4, the MTF values (shown in the solid line in the figure) of the exposure controlling mechanism 1 of the present invention are kept at high levels over a wide range of the light amount F numbers in comparison with the MTF values of the conventional technique.

The embodiment shown in FIG. 1 also may be constructed so that the first iris blade 2 to which the first ND filter 5 having at least two levels of transmissivity is attached, the second iris blade 3 to which no ND filter is attached, and the third iris blade 4 to which the second ND filter 6 having no difference in transmissivity is attached are arranged from an object in the order, and so that the first iris blade 2 is inserted into the iris aperture, which has already been formed by the second iris blade 3 and the third iris blade 4, at a later time. A part of the light entered from the object side hits the image sensor or the like, and is reflected by it to return to the object side. A part of the returning light is again reflected by the surface of the second ND filter 6 of the third iris blade 4 to travel to the image sensor. The other part of the returning light penetrates the second ND filter 6 to be attenuated. The attenuated penetration light is reflected by the surface of the first ND filter 5 of the first iris blade 2 to return to the image sensor after penetrating again the second ND filter 6 of the third iris blade 4 and being attenuated by it. The reflection light that passes through the second ND filter 6 twice is extremely attenuated by it to be almost negligible.

It is the light that returns first that becomes a problem. If the iris aperture is first formed with the first iris blade 2 to which the first ND filter 5 having at least two levels of transmissivity is attached and the second iris blade 3 to which no ND filter is attached, and then if the third iris blade 4 to which the second ND filter 6 having no difference in transmissivity is inserted into the formed iris aperture at a later time, two pieces of light are produced. One of them is the light that is first reflected by the surface of the First ND filter 5 having at least two levels of transmissivity of the first iris blade 2 and returns to the image sensor. The other of them is the light that is first reflected by the surface of the second ND filter 6 of the third iris blade 4 late and returns to the image sensor. The two pieces of the light move and vary in strength on the image sensor to be photographed in accordance with the movement of the two iris blades 2 and 4.

For reducing as much as possible the two pieces of the reflecting light which move and vary in strength on the image sensor to be photographed, it is necessary to insert into the iris aperture the iris blade on the image sensor side, that is, the third iris blade 4 to which the second ND filter 6 is attached, precedently to the first iris blade 2, to which the first ND filter 5 is attached, on the object side. For realizing both of the prevention of the degradation of the image quality at an intermediate state in the process from the opened iris aperture to the small iris aperture and the decrease of coming in of the reflected light coming out of the image sensor or the like, it is the most desirable structure to arrange the first iris blade 2, to which the first ND filter 5 having at least two levels of transmissivity is attached, the second iris blade 3, to which no ND filter is attached, and the third iris blade 4, to which the second ND filter 6 having no positional difference in transmissivity is attached, from the object side in the order and to make the first iris blade 2 cover the iris aperture at a later time than the third iris blade 4.

Incidentally, the concrete shapes and structures of respective parts shown in the aforesaid embodiment are all only examples in a case of implementing the present invention, and accordingly the scope and the sprit of the present invention should not be interpreted restrictedly to the shapes and the structures.

What is claimed is:

1. An imaging apparatus with an exposure controlling mechanism defining an iris aperture by moving iris blades on surfaces perpendicular to an optical axis, said exposure controlling mechanism comprising:

a first iris blade to which a first ND filter having at least two levels of transmissivity is attached;

a second iris blade to which no ND filter is attached; and a third iris blade to which a second ND filter having a single transmissivity is attached, wherein said first to said third iris blades are made to differ respectively in amounts and phases of their displacements caused by an operation of a driving means.

2. The imaging apparatus according to claim 1, wherein:

said driving means for said first to said third iris blades includes a driving motor attached to a housing of said exposure controlling mechanism, and an operation arm fixed to a rotation axis of the driving motor, said operation arm including three arm portions at a tip portion of each of which one connecting pin is projectingly fixed, respectively, said connecting pin being slidably engaged with an elongated link aperture of each of said first to said third iris blades, and said first to said third iris blades are made to differ respectively in amounts and phases of their displacements caused by a rotation of the driving motor owing to differences in lengths of the three arm portions and projection directions from the center of the driving motor of said operation arms.

3. The imaging apparatus according to claim 1, wherein said first, second and third iris blades are arranged from the object side in the order.

4. The imaging apparatus according to claim 1, wherein said first iris blade covers said iris aperture at a later time than said third iris blade.

* * * * *